United States Patent
Cade et al.

(10) Patent No.: US 10,458,317 B2
(45) Date of Patent: Oct. 29, 2019

(54) BOOSTED ENGINE SYSTEM OF A MOTOR VEHICLE

(71) Applicant: Ford Global Technologies, LLC, Dearborn, MI (US)

(72) Inventors: Michael John Cade, Welwyn Garden (GB); Steve Johnson, Brentwood (GB); Paul Nigel Turner, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 15/727,435

(22) Filed: Oct. 6, 2017

(65) Prior Publication Data
US 2018/0112589 A1    Apr. 26, 2018

(30) Foreign Application Priority Data

Oct. 21, 2016 (GB) .................................. 1617825.3
May 16, 2017 (GB) .................................. 1707817.1

(51) Int. Cl.
*F02B 37/10* (2006.01)
*F04D 27/00* (2006.01)
(Continued)

(52) U.S. Cl.
CPC ............ *F02B 37/10* (2013.01); *F02B 37/007* (2013.01); *F02B 37/14* (2013.01); *F02B 39/10* (2013.01);
(Continued)

(58) Field of Classification Search
CPC ........ F02B 37/10; F02B 37/007; F02B 39/10; F02B 37/14; F04D 27/002; F04D 25/0606; Y02T 10/144; F05D 2220/40
(Continued)

(56) References Cited

U.S. PATENT DOCUMENTS 9,322,362 B2    4/2016  Lim et al.
2010/0287932 A1*  11/2010  Tanaka .................... F02B 37/10
                                              60/602
(Continued)

FOREIGN PATENT DOCUMENTS

DE    102007019060 A1   11/2008
GB       2090913 A       7/1982
(Continued)

OTHER PUBLICATIONS

Intellectual Property Office of the United Kingdom, Combined Search and Examination Report Issued in Application No. GB1617825.3, dated Mar. 30, 2017, 7 pages.

*Primary Examiner* — Hoang M Nguyen
(74) *Attorney, Agent, or Firm* — Geoffrey Brumbaugh; McCoy Russell LLP

(57) ABSTRACT

Methods and systems are provided for a boosted engine system having an engine arranged to receive boosted air from a variable geometry turbocharger and an electrically powered compressor arranged in parallel with the turbocharger. During temporary high torque demands above a predefined level, the electrically powered compressor may be used to supplement the flow of boosted air from the turbocharger. Additionally, a recirculation circuit around the electrically powered compressor may be provided to build up pressure in the electrically powered compressor before it is connected to the engine so as to minimize fluctuations in engine boost pressure upon start-up of the electrically powered compressor.

20 Claims, 4 Drawing Sheets

(51) Int. Cl.
*F02B 39/10* (2006.01)
*F04D 25/06* (2006.01)
*F02B 37/007* (2006.01)
*F02B 37/14* (2006.01)

(52) U.S. Cl.
CPC ....... *F04D 25/0606* (2013.01); *F04D 27/002* (2013.01); *F05D 2220/40* (2013.01); *Y02T 10/144* (2013.01)

(58) Field of Classification Search
USPC .... 60/600, 605.1, 605.2, 607, 609, 610, 611
See application file for complete search history.

(56) References Cited

U.S. PATENT DOCUMENTS

| | | | |
|---|---|---|---|
| 2011/0209473 A1* | 9/2011 | Fritz | F01K 23/065 60/605.2 |
| 2014/0157774 A1* | 6/2014 | McConville | F02B 37/164 60/611 |
| 2015/0247447 A1* | 9/2015 | Leroy | F02D 21/08 60/273 |
| 2016/0076438 A1 | 3/2016 | Tabata et al. | |
| 2016/0356211 A1* | 12/2016 | Wicks | F02B 41/04 |

FOREIGN PATENT DOCUMENTS

| | | |
|---|---|---|
| JP | 2010048225 A | 3/2010 |
| JP | 2014202135 A | 10/2014 |
| WO | 2016002964 A1 | 1/2016 |
| WO | 2016031939 A1 | 3/2016 |

\* cited by examiner

BOOSTED ENGINE SYSTEM OF A MOTOR VEHICLE

CROSS-REFERENCE TO RELATED APPLICATIONS

The present application claims priority to Great Britain Patent Application No. 1617825.3, filed Oct. 21, 2016, and to Great Britain Patent Application No. 1707817.1, filed May 16, 2017. The entire contents of the above-referenced applications are hereby incorporated by reference in their entirety for all purposes.

FIELD

The present description relates to motor vehicles and in particular to a boosted engine system of a motor vehicle having an internal combustion engine and compressor to increase the pressure of the air entering the engine.

BACKGROUND/SUMMARY

An internal combustion engine of a motor vehicle may include a turbocharger to increase the pressure of the air entering the engine in order to improve combustion efficiency and torque output. The turbocharger may include a turbine disposed in an exhaust passage of the engine and a compressor disposed in an intake passage of the engine, the compressor driven by rotation of the turbine.

It is a problem with such turbocharger boosted engines that even if a variable geometry turbocharger is used the overall performance of the engine is compromised by the fact that the turbocharger has normally been designed to accommodate the maximum flow of exhaust gas from the engine to the turbine of the turbocharger when the engine is operating at maximum engine speed with a wide open throttle.

This requires the use of a turbocharger having large capacity in order to prevent unduly high backpressure on the engine and/or overspeeding of the turbocharger at very high exhaust gas flow rates. However, the use of a large capacity turbocharger has the disadvantage that at low engine speeds the flow rate of exhaust gas from the engine is too low to provide a sudden increase in boost pressure if there is a sudden increase in driver demand thereby resulting in what is often referred to as 'turbo lag'.

In order to overcome this problem it has been proposed to use an electrically powered compressor to continuously fill in for the turbocharger at low to moderate engine speeds with the turbocharger taking over at higher engine speeds.

Although such an approach overcomes the aforesaid 'turbo lag' problem it introduces a further problem in that such continued use of the electrically powered compressor places a large drain on the electrical generation circuit of the motor vehicle, thereby increasing fuel consumption and in some cases requiring additional electrical storage capacity to be provided to deal with operation of the electrically powered compressor at very low engine speeds where the output from the electrical generation system of the motor vehicle is unable to cope with all of the electrical demands placed upon it.

It has further been proposed in JP-A-2010048225 to use first and second turbochargers and use an electric motor to spin up the second turbocharger so as to reduce fluctuations in turbocharging pressure when switching to the second turbocharger that would otherwise occur. However, such an arrangement is very complicated in construction requiring numerous valves and also requires the use of an electric motor that is able to withstand the very high temperatures associated with the turbine part of the second turbocharger.

It is an object of this disclosure to provide a boosted engine system that overcomes the problems associated with the aforesaid prior art. In one example, the issues described above may be addressed by a method, comprising: responsive to a demanded torque being above a threshold while providing boosted air at a first pressure to an engine via a turbocharger compressor, operating an electric compressor arranged in parallel with the turbocharger compressor and fluidly disconnected from the engine to increase a second pressure in a recirculation circuit around the electric compressor; and responsive to the second pressure reaching the first pressure, fluidly connecting the electric compressor to the engine. In this way, a torque demand of the engine may be met without continuously operating the electric compressor and increasing an electrical demand of the engine. Further, by initially fluidly disconnecting the electric compressor from the engine while the pressure (boost pressure) output by the electric compressor is built up (increased) and only fluidly connecting the electric compressor and the engine upon reaching the pressure of boosted air provided to the engine by the turbocharger compressor, a sudden drop in boost pressure upon operating the electric compressor and connecting the electric compressor to the engine is avoided. As a result, increased boost pressure to meet the operator torque demand may be provided more efficiently and quickly, thereby increasing engine performance and vehicle operator satisfaction.

In another example, the issues described above may be addressed by a boosted engine system for a motor vehicle comprising an internal combustion engine, a small capacity variable geometry turbocharger sized to meet demands for boosted air up to a predefined supply level and an electrically powered compressor arranged in parallel to the turbocharger, the engine being arranged to receive a primary supply of boosted air during normal engine running below the predefined supply level from the turbocharger and to receive a supplementary supply of boosted air from the electrically powered compressor when it is required to meet a temporary high demand for boosted air above the predefined supply level and a recirculation circuit to build up pressure when the electrically powered compressor is started before the electrically powered compressor is connected to the engine, the recirculation circuit comprising an electrically controlled recirculation valve to control the flow of air through a conduit linking an outlet from the electrically powered compressor to an inlet to the electrically powered compressor, an electrically controlled shut-off valve located between the outlet from the electrically powered compressor and the engine to selectively isolate the outlet from the electrically powered compressor from the engine and a backflow control valve to prevent the backflow of air from the inlet to the electrically powered compressor to atmosphere wherein upon starting of the electrically powered compressor the electrically controlled recirculation valve is kept open and the electrically controlled shut-off valve is kept closed until the pressure in the recirculation circuit has reached a predefined limit whereupon the electrically controlled shut-off valve is opened and the electrically controlled recirculation valve is closed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
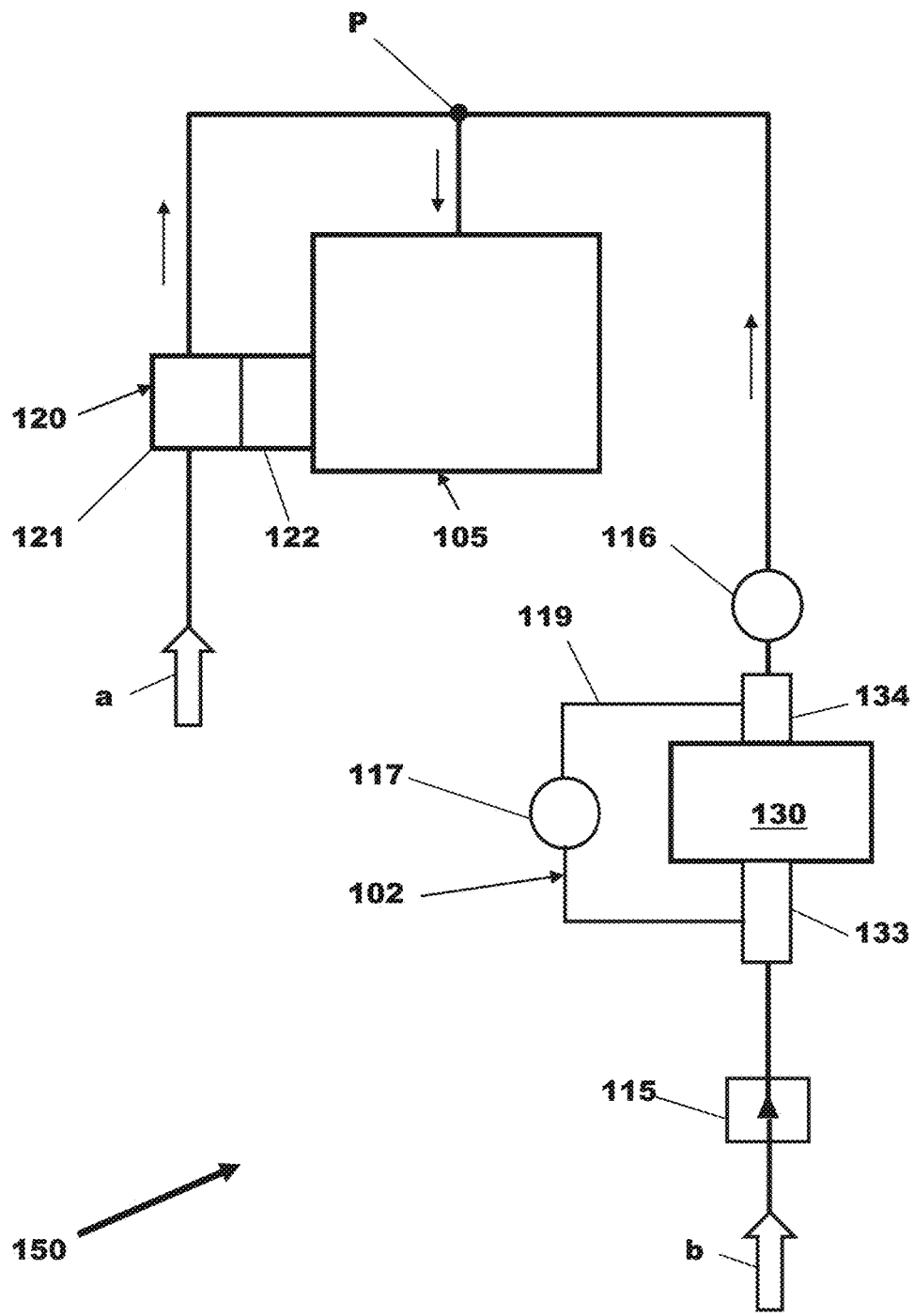
FIG. 1 is a schematic diagram of a boosted engine system according to a first aspect of the disclosure.
Figure 2:
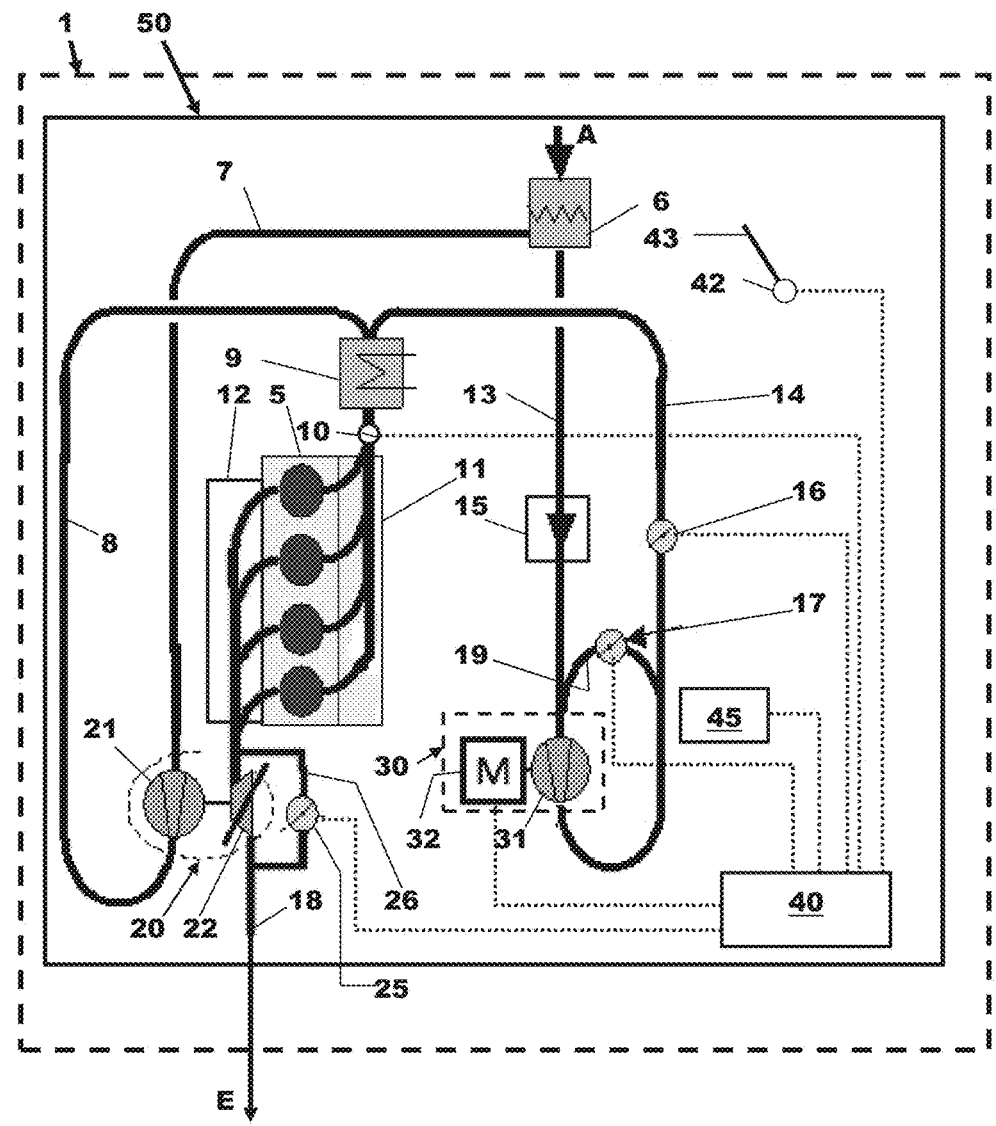
FIG. 2 is a schematic diagram of a motor vehicle according to a second aspect of the disclosure having a boosted engine system according to the first aspect of the disclosure.
Figure 3A:
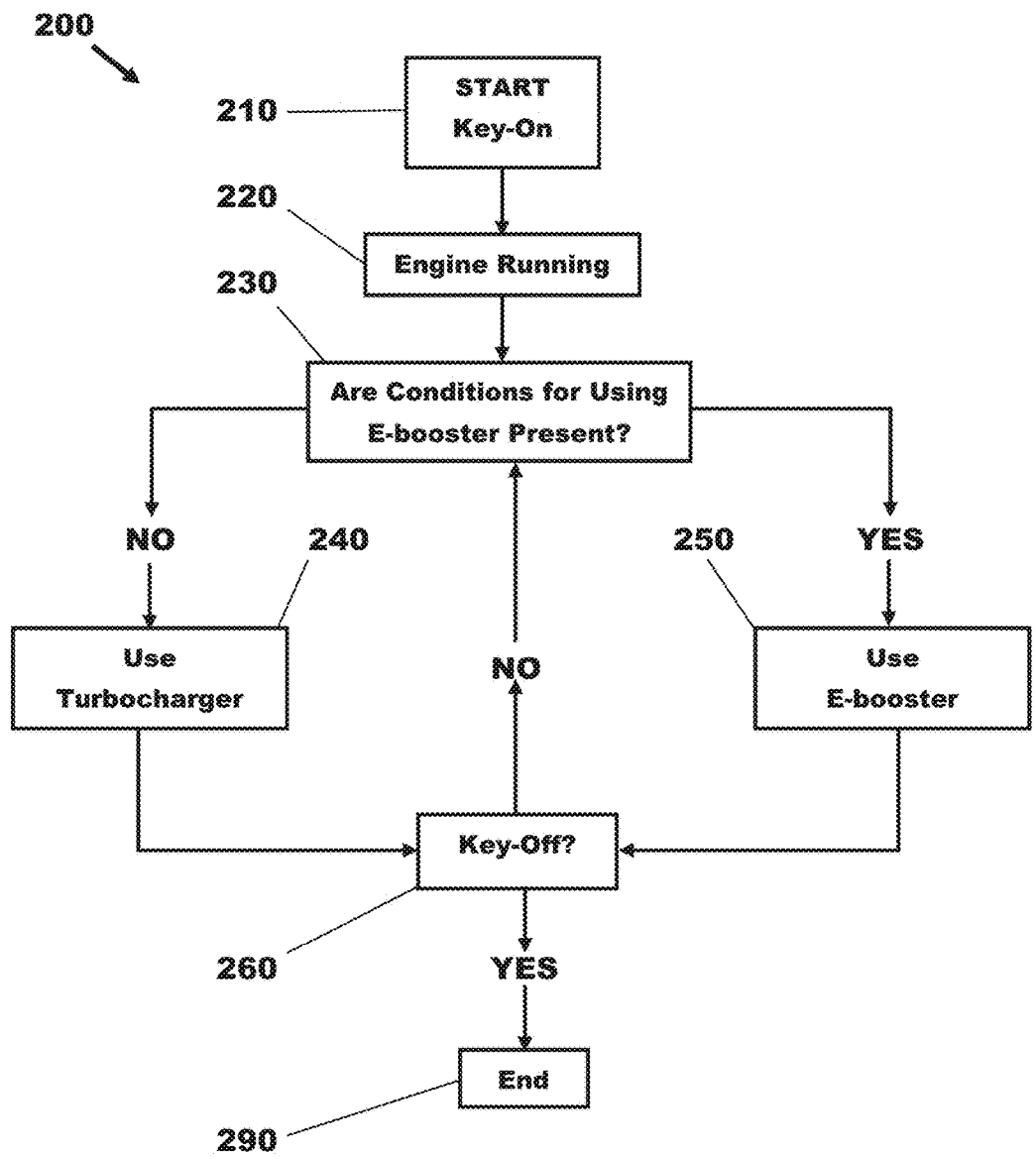
FIG. 3A is a high level flow chart of a method of controlling a boosted engine system in accordance with a third aspect of the disclosure.

The following description relates to systems and methods for operating an electrically powered compressor arranged in parallel with a turbocharger compressor, as shown by the systems of FIGS. 1 and 2, to provide a desired boost pressure to the engine in order to deliver an operator demanded torque. As also shown in FIGS. 1 and 2, the electrically powered compressor may include a recirculation circuit and one or more valves for selectively fluidly coupling the electrically powered compressor with an intake manifold of the engine. When increased boost, in addition to what is able to be supplied by the turbocharger compressor, is required to deliver the current operator demanded torque, the electrically powered compressor may be operated to provide the increased boost pressure, as shown by the method of FIG. 3A. However, the boost pressure output by the electrically operated compressor may first be built up within the recirculation circuit to a level that is the same or greater than the boost pressure provided to the engine via the turbocharger compressor. Then, upon reaching this boost pressure level, the electrically powered compressor may be fluidly coupled with the intake manifold of the engine in order to supply the increased boost pressure to the engine, without first decreasing the pressure already supplied to the engine by the turbocharger compressor. In this way, a required boost pressure for delivering the operator demanded torque level may be provided to the engine smoothly, without an initial decrease in boost pressure, thereby increasing engine performance.

According to a first aspect of the disclosure, there is provided a boosted engine system for a motor vehicle comprising an internal combustion engine, a small capacity variable geometry turbocharger sized to meet demands for boosted air up to a predefined supply level and an electrically powered compressor arranged in parallel to the turbocharger, the engine being arranged to receive a primary supply of boosted air during normal engine running below the predefined supply level from the turbocharger and to receive a supplementary supply of boosted air from the electrically powered compressor when it is required to meet a temporary high demand for boosted air above the predefined supply level and a recirculation circuit to build up pressure when the electrically powered compressor is started before the electrically powered compressor is connected to the engine, the recirculation circuit comprising an electrically controlled recirculation valve to control the flow of air through a conduit linking an outlet from the electrically powered compressor to an inlet to the electrically powered compressor, an electrically controlled shut-off valve located between the outlet from the electrically powered compressor and the engine to selectively isolate the outlet from the electrically powered compressor from the engine and a backflow control valve to prevent the backflow of air from the inlet to the electrically powered compressor to atmosphere wherein upon starting of the electrically powered compressor the electrically controlled recirculation valve is kept open and the electrically controlled shut-off valve is kept closed until the pressure in the recirculation circuit has reached a predefined limit whereupon the electrically controlled shut-off valve is opened and the electrically controlled recirculation valve is closed.

The backflow valve may be a non-return valve arranged to prevent air from flowing from the inlet of the electrically powered compressor back to atmosphere.

Alternatively, the backflow valve may be an electrically controlled backflow valve arranged to automatically close if the pressure at the inlet to the electrically powered compressor is greater than atmospheric pressure so as to prevent air from flowing from the inlet of the electrically powered compressor back to atmosphere.

There may be a first flow path from atmosphere through the turbocharger to the engine and a second flow path from atmosphere through the electrically powered compressor arranged in parallel to the first flow path between a position upstream of the engine and a source of atmospheric air.

The position upstream of the engine may be an inlet to an intercooler having an outlet arranged to flow air to the engine and the system further comprises an air filter through which all air for the engine from the source of atmospheric air flows and the first and second air flow paths both have a respective low pressure end connected to an outlet from the air filter.

The first air flow path may have a first portion connected at one end to the air filter and a second end connected to an inlet of a compressor of the turbocharger and a second portion connected at one end to an outlet of the compressor of the turbocharger and connected at a second end to the inlet of the intercooler and the second air flow path may have a first portion including the back flow valve connected at one end to the air filter and a second end connected to the inlet of the electrically powered compressor and a second portion connected at one end to the outlet of the electrically powered compressor and connected at a second end to the inlet of the intercooler and the electrically controlled shut-off valve is arranged to control the flow of boosted air through the second portion of the second flow path.

The turbocharger may have a turbine having an inlet arranged to receive a supply of exhaust gas from the engine and an outlet to flow exhaust gas to atmosphere and a bypass passage having a bypass flow control valve is connected between a position upstream from the inlet to the turbine and a position downstream from the outlet of the turbine.

The bypass flow control valve may be an electrically controlled valve.

The system may further comprise an electronic controller to control the operation of the system.

Opening and closing of the electrically controlled shut-off valve and opening and closing of the electrically controlled recirculation valve may both be controlled by the electronic controller.

Opening and closing of the bypass flow control valve may be controlled by the electronic controller and the electronic controller may be arranged to open the bypass flow control valve when a predefined exhaust gas pressure limit upstream from the turbine is reached.

Alternatively, opening and closing of the bypass flow control valve may be controlled by the electronic controller and the electronic controller may be arranged to open the bypass flow control valve when a predefined turbine rotational speed is reached.

The electrically powered compressor may have an electric motor controlled by the electronic controller and the electronic controller may be arranged to prevent use of the electrically powered compressor when the bypass flow valve is in a closed state.

According to a second aspect of the disclosure there is provided a motor vehicle having a boosted engine system constructed in accordance with said first aspect of the disclosure.

According to a third aspect of the disclosure there is provided a method of controlling a boosted engine system of a motor vehicle, the system comprising an engine, a variable geometry turbocharger sized to meet demands for boosted air up to a predefined supply level and an electrically powered compressor arranged in parallel to the turbocharger, the engine being arranged to receive a primary supply of boosted air during normal engine running below the predefined level from the turbocharger and to receive a supplementary supply of boosted air from the electrically powered compressor when it is required to meet a temporary high demand for boosted air above the predefined supply level and a recirculation circuit to build up pressure when the electrically powered compressor is started before the electrically powered compressor is connected to the engine, the boosted engine system further comprising a backflow valve to prevent the backflow of air from an inlet to the electrically powered compressor, an electrically controlled shut-off valve to selectively isolate an outlet of the electrically powered compressor from the engine and a recirculation circuit including an electrically controlled recirculation valve wherein the method comprises checking whether at least one condition for using the electrically powered compressor is present and, if the at least one condition is present, energizing the electrically powered compressor while the electrically controlled shut-off valve is kept closed and the electrically controlled recirculation valve is kept open to build up pressure in the recirculation circuit and, when the pressure in the recirculation circuit has reached a pressure at least equal to the pressure of the primary supply of boosted air, closing the recirculation valve and opening the electrically controlled shut-off valve to supply boosted air to the engine.

One condition for using the electrically powered compressor may be a demand for torque from a driver of the motor vehicle greater than a predefined limit.

Alternatively, one condition for using the electrically powered compressor may be a current requirement for boosted air that is above the predefined supply level and so cannot be met solely by use of the turbocharger.

As yet a further alternative, there may be two conditions both of which must be met for the electrically powered compressor to be energized, the first condition may be a demand for torque from a driver of the motor vehicle greater than a predefined limit and the second condition may be a current requirement for boosted air that is above the predefined supply level and so cannot be met solely by use of the turbocharger.

Turning to FIG. 1, there is shown a boosted engine system 150 for a motor vehicle comprising an internal combustion engine 105, a small capacity variable geometry turbocharger 120 sized to meet demands for boosted air up to a predefined supply level and an electrically powered compressor 130 arranged in parallel to the turbocharger 120 which comprises a compressor 121 and an exhaust driven turbine 122. Air is supplied to the compressor 121 from atmosphere as indicated by the arrow 'a'.

The engine 105 is arranged to receive a primary supply of boosted air during normal engine running below the predefined supply level from the turbocharger 120 and to receive a supplementary supply of boosted air from the electrically powered compressor 130 when it is required to meet a temporary high demand for boosted air above the predefined supply level.

A recirculation circuit 102 is provided to build up pressure in the supplementary supply when the electrically powered compressor 130 is started before the electrically powered compressor 130 is connected to the engine 105.

The recirculation circuit 102 comprises an electrically controlled recirculation valve 117 to control the flow of air through a conduit 119 linking an outlet 134 from the electrically powered compressor 130 to an inlet 133 to the electrically powered compressor 130. An electrically controlled shut-off valve 116 is located between the outlet 134 from the electrically powered compressor 130 and the engine 105 to selectively isolate the outlet 134 from the electrically powered compressor 130 from the engine 105.

A backflow control valve 115 is provided to prevent the backflow of air from the inlet 133 to the electrically powered compressor 130 to atmosphere indicated by arrow 'b'. The backflow valve 115 can comprise a non-return valve arranged to prevent air from flowing from the inlet 133 of the electrically powered compressor 130 back to atmosphere or can take the form of an electrically controlled backflow valve arranged to automatically close if the pressure at the inlet 133 to the electrically powered compressor 130 is greater than atmospheric pressure so as to prevent air from flowing from the inlet 133 of the electrically powered compressor 130 back to atmosphere.

Upon starting of the electrically powered compressor 130, the electrically controlled recirculation valve 117 is kept open and the electrically controlled shut-off valve 116 is kept closed until the pressure in the recirculation circuit 102 has reached a predefined pressure limit (e.g., threshold) which is a pressure level equal to or slightly greater than the pressure of the air currently being supplied to the engine 105 from the turbocharger 120. When the predefined pressure limit is reached, the electrically controlled shut-off valve 116 is opened and the electrically controlled recirculation valve 117 is closed at the same time.

This arrangement prevents a sudden drop off in pressure (of the air supplied to engine 105) from occurring as would be the case if the electrically controlled shut-off valve 116 were to be opened while the electrically powered compressor 130 is not up to speed or is off.

Therefore, there is a first flow path from atmosphere 'a' through the turbocharger 120 to the engine 105 and a second flow path from atmosphere indicated as arrow 'b' through the electrically powered compressor 130 arranged in parallel to the first flow path between a position upstream of the engine 105 indicated as point 'P' and a source of atmospheric air indicated by the arrows 'a' and 'b'.

With particular reference to FIG. 2, there is shown a motor vehicle 1 having a boosted engine system 50. The main components of the boosted engine system 50 comprise an internal combustion engine 5 which in the case of this example is a four cylinder inline direct injection engine, a variable geometry turbocharger 20, an electrically powered compressor 30 and an electronic controller 40.

Air enters an air inlet flow path from a source of atmospheric air such as the atmosphere surrounding the engine 5 as indicated by the arrow 'A' and flows through an air filter 6 to a pair of parallel air flow paths.

The first air flow path has a first portion 7 connecting the air filter 6 to an inlet of a compressor 21 of the turbocharger 20 and a second portion 8 connecting an outlet of the compressor 21 of the turbocharger 20 to an inlet of an intercooler 9.

The second air flow path has a first portion 13 connecting the air filter 6 to an inlet of a compressor 31 of the electrically powered compressor 30 and a second portion 14 connecting an outlet of the compressor 31 of the electrically powered compressor 30 to an inlet of the intercooler 9.

It will be appreciated that instead of using a single air filter 6 there could be two separate air filters one for the first air flow path and one for the second air flow path.

A backflow valve in the form of a non-return valve 15 is located in the second air flow path between the air filter 6 and the inlet side of the compressor 31 to prevent back flow from the compressor 31.

An electrically controllable shut-off valve 16 is located between the outlet of the compressor 31 and the intercooler 14 to isolate the compressor 31 of the electrically powered compressor 30 from the engine 5.

An electrically controllable recirculation valve 17 is located in an air recirculation circuit 19 linking the outlet of the compressor 31 to the inlet of the compressor 31. The recirculation circuit 19 is arranged to connect at a position between the electrically controlled shut-off valve 16 and the outlet of the compressor 31 of the electrically powered compressor the second portion 14 of the second flow path to the inlet of the compressor 31 of the electrically powered compressor 30 and the electrically controlled recirculation valve 17 is used to selectively control the flow of boosted air through the recirculation circuit 19. When the electrically powered compressor 30 is not operating the shut-off valve 16 is kept shut (e.g., closed such that air flow from the outlet of the compressor 31 is blocked from traveling to the intercooler 9).

After being cooled in the intercooler 9 the air flows via a throttle valve 10 to an inlet manifold 11 of the engine 5 through the engine 5 and exits the engine 5 via an exhaust manifold 12 that flows exhaust gas to an inlet of a turbine 22 of the turbocharger 20. After flowing through the turbine 22 of the turbocharger 20 the exhaust gas flows from an outlet of the turbine 22 via an exhaust pipe 18 to atmosphere as indicated by the arrow 'E'. It will be appreciated that various aftertreatment devices and noise reduction devices are normally provided in the flow path from the turbine 22 back to atmosphere.

A bypass passage 26 is connected to the exhaust flow path between positions located upstream and downstream from the turbine 22 so as to selectively allow exhaust gas to bypass the turbine 22 of the turbocharger 20. In the case of this example an electrically controllable bypass valve 25 is provided to control the flow of exhaust gas through the bypass passage 26. Opening and closing of the bypass valve 25 is controlled by the electronic controller 40. However, it will be appreciated that a pressure operated bypass valve could be used instead of an electrically controllable bypass valve. In which case a sensor would be used to provide an indication of whether the bypass valve is open or closed.

The electrically powered compressor 30 includes an electric motor 32 to drive the compressor 31 in response to a control signal from the electronic controller 40.

The electronic controller 40 may receive input data from the various sensors (as described further below), process the input data, and trigger the actuators of the engine (e.g., throttle 10, electric motor 32, electrically controllable shut-off valve 16, the electrically controllable recirculation valve 17, and the electrically controllable bypass valve 26) in response to the processed input data based on instruction or code programmed therein corresponding to one or more routines. In one example, the instruction or code may be stored on a memory of the electronic controller 40.

For example, the electronic controller 40 is arranged to control the opening and closing of the electrically controllable shut-off valve 16, the electrically controllable recirculation valve 17 and the electrically controllable bypass valve 26 and operation of the electric motor 32 in accordance with predefined control routines stored in the memory of the electronic controller 40.

The electronic controller 40 may also be arranged to control the fuel supply to the engine or may form part of a powertrain control system performing such a function.

The electronic controller 40 receives a number of inputs shown collectively as a single input 45 in FIG. 2. The inputs 45 include those indicative of the operation of the engine 5 such as for example, engine rotational speed, inlet manifold pressure, exhaust gas pressure upstream of the turbine 22, throttle valve position as well as inputs indicative of other system parameters such as, for example, air pressure downstream from the turbocharger compressor, air pressure in the recirculation circuit 19, air pressure downstream from the compressor 31 of the electrically powered compressor 30.

In addition to the inputs 45 the electronic controller 40 also receives an input indicative of driver demand from an accelerator pedal position sensor 42 arranged to sense the angular position of an accelerator pedal 43 of the motor vehicle 1.

Using the inputs 45 and 42 the electronic controller 40 is arranged to control the operation of the engine system 50 of which it forms a part.

Operation of the engine system 50 is as follows.

During normal running of the engine 5 the electric motor 32 of the electrically powered compressor 30 is switched off and the electrically controllable shut-off valve 16 and the bypass valve 25 are both placed in a closed state by the electronic controller 40.

Air entering the air inlet flow path therefore flows from the air filter 6 through the first portion 7 connecting the air filter 6 to the air inlet side of a compressor 21 of the turbocharger 20 where it is compressed and then flows via the second portion 8 of the air path to the inlet of the intercooler 9 and from there via the throttle valve 10 to the engine 5. No air flows from the electrically powered compressor 30 because the electric motor 32 is switched off and the compressor 32 is isolated from the engine 5 by the closed electrically controllable shut-off valve 16 that is kept closed whenever the electrically powered compressor 30 is not operating.

In this state the engine 5 acts as a conventional turbocharged engine having a variable geometry turbocharger with the geometry of the turbocharger 20 being adjusted by the electronic controller 40 to match variations in driver demand as sensed by the accelerator pedal position sensor 42.

Therefore, there is no electrical demand placed upon the electrical generation or storage systems of the motor vehicle 1 by the electrically powered compressor 30 because it is not operating. The variable geometry turbocharger 20 is sized so as to be able to provide sufficient boost to meet normal operating needs such as for example cruising on a motorway, constant speed town driving and moderate acceleration. By using a variable geometry turbocharger 20 that is of a relatively small size the turbocharger 20 is very responsive to demand requests at low engine speed and so turbo lag is minimized by this approach.

It will be appreciated that as the speed of the engine 5 increases the flow of exhaust gas from the engine 5 at high throttle openings will eventually reach a level where excessive back pressure will be produced by the turbine 22 of the turbocharger 20 due to its small size and/or the volume of exhaust gas flow to the turbine 22 is such that overspeeding of the turbocharger 20 will be caused. To prevent either of these eventualities from occurring, the bypass valve 25 is opened by the electronic controller 40 when at least one of a predefined exhaust gas pressure limit upstream from the turbine 22 is reached or a predefined turbine rotational speed is reached. The opening of the bypass valve 25 has the effect of allowing some of the exhaust gas to bypass the turbine 22 of the turbocharger 20 thereby reducing the exhaust backpressure on the engine 5. However, due to the volume of exhaust gas that can now bypass the turbine 22 it has the effect of limiting the boost pressure that can be provided by the turbocharger 20 when operating above such a high exhaust gas flow and so any additional temporary demand from the driver for more power cannot be met solely by the small turbocharger 20.

In order to overcome this limitation, the electrically powered compressor 30 is used to meet any additional temporary demand from the driver when the bypass valve 25 is open.

Therefore, when the demand from the driver as sensed by the accelerator pedal position sensor 42 exceeds a predefined demand limit when the bypass valve 25 is open, the electronic controller 40 is arranged to open the recirculation valve 17 and start the electric motor 32 causing the compressor 31 to increase the air pressure in the recirculation circuit 19. In one none limiting example a driver demand of 75% was used as the predefined demand limit. It will be appreciated that air cannot flow back to the air filter 6 due to the presence of the non-return valve 15 in the first portion 13 of the second air flow path and the closed electrically controlled shut-off valve 16 in the second portion 14 of the second air flow path.

When the pressure in the recirculation circuit 19 has reached or exceeds the pressure in the second portion 8 of the air path to the inlet of the intercooler 9, that is to say, the current boosted air pressure being supplied by the turbocharger 20, the electrically controlled shut-off valve 16 is opened and the recirculation valve 17 is simultaneously closed. Due to the large pumping capacity of the compressor 31 of the electrically powered compressor 30, the delay between energization of the electric motor 32 and opening of the electrically controlled shut-off valve 16 is minimal and normally in the order of a few tenths of a second.

Ambient air now flows from the air filter 6 through the first portion 13 of the second air flow path to the compressor 31 of the electrically powered compressor 30 and via the second portion 14 of the second airflow path to the engine 5 via the intercooler 9 as well as from the air filter 6 through the first portion 7 of the first air flow path to the compressor 21 of the turbocharger 20 and via the second portion 8 of the first airflow path to the engine 5 via the intercooler 9. That is to say the electrically powered compressor 30 acts so as to supplement the turbocharger 20. Specifically, boosted airflow is provided to the engine 5 from both the compressor 21 of the turbocharger 20 and the electrically powered compressor 30. As a result, a boost demand for the current torque demand (e.g., operator torque demand based on the accelerator position) may be achieved, even when the bypass valve 25 is open or when the turbocharger 20 alone is unable to provide the desired boost demand.

The compressor 31 of the electrically powered compressor 30 is sized such that it is able to provide sufficient additional pressurized air at a desired maximum boost pressure to the engine 5 to meet the maximum demand of the engine at the maximum operating speed of the engine 5. Although this requires the use of a large capacity compressor 31 that draws a large amount of power from the electrical system of the motor vehicle 1 the power draw is only for a very short period of time. For example, the electric motor 32 can be required to draw 25 kw from the electrical system of the motor vehicle 1 when driving the compressor 31 of the electrically powered compressor 30 but, because the electrically powered compressor 30 is only used to satisfy temporary high power demands such as for example near full throttle acceleration requests at higher engine speeds, the electrically powered compressor 30 only operates for a very short period of time such as, for example, 15 to 20 seconds and so the total drain of electrical energy from the electrical system of the motor vehicle 1 is not excessive.

To prevent excessive electrical power usage the electronic controller 40 is arranged to prevent the electrically powered compressor 30 from operating continuously for a long period of time and after a predefined period of time power to the electric motor 32 is automatically cut-off. The electrically powered compressor 30 therefore is arranged to operate as an over-boost device in situations where the boost available from the small turbocharger are insufficient and is not used during normal engine running.

As soon as the driver demand drops below the predefined demand limit, as indicated by the output from the accelerator pedal position sensor 42, the electronic controller 40 is operable to switch off the electric motor 32 and close the electrically controlled shut-off valve 16 so as to isolate the compressor 31 of the electrically powered compressor 30 from the engine 5. Boosting of the engine 5 then returns to use of the turbocharger 20 acting alone which at such demand levels is able to meet any demand for boost pressure from the engine 5.

Therefore, in summary, the electrically powered compressor 30 is only used to meet peak temporary power demands that cannot be met by the turbocharger 20 acting alone and is not used during normal running of the engine 5 the demand for which are met solely by use of the small size variable geometry turbocharger 20.

Figure 3B:
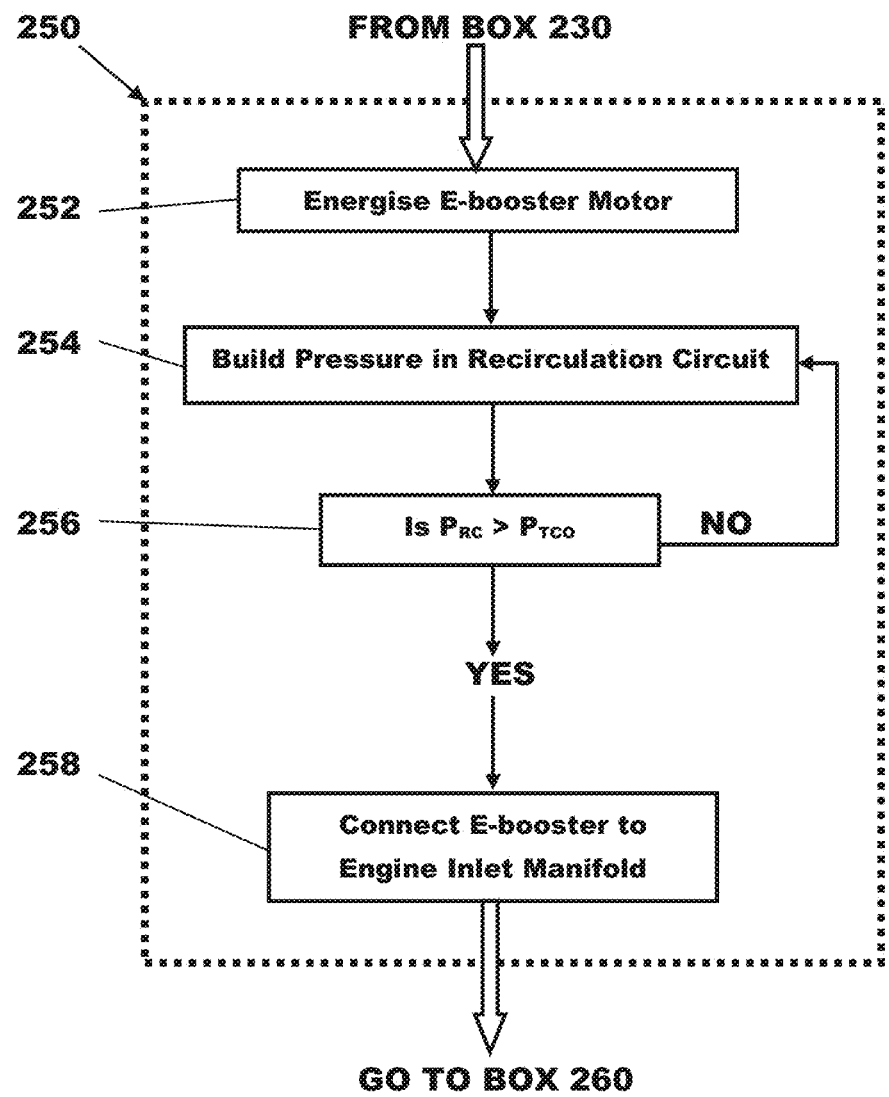
FIG. 3B shows a flow chart of a method for operating an electrically powered compressor during the method of FIG. 3A.

With reference to FIGS. 3A and 3B there is shown a method 200 of controlling a boosted engine system of a motor vehicle such as the system 150 (FIG. 1) and/or 50 (FIG. 2) having an engine, a turbocharger and an electrically powered compressor. Instructions for carrying out method 200 may be executed by a controller (e.g., electronic controller) based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

The method starts in box 210 which is a Key-On and engine start process and then advances to box 220 where the engine is running and is responsive to power demands from a user of the motor vehicle. In box 230 it is checked whether the conditions for using the electrically powered compressor (e.g., electrically powered compressor 130 shown in FIG. 1 or electrically powered compressor 30 shown in FIG. 2) are present. These conditions comprise in the case of this embodiment whether a demand for torque from a driver of the motor vehicle is greater than a predefined limit (e.g., threshold), as indicated by the output from the accelerator pedal 42 when the turbocharger is already operating in a bypassed state as indicated by an open state of the bypass valve 25. That is to say, can the turbocharger satisfy any further driver demand for torque from the engine? In another example, the conditions for using (e.g., operating) the electrically powered compressor may include the driver (e.g., operator) torque demand being greater than a threshold level, where the threshold level is a torque level corresponding to a maximum boost pressure that the turbocharger compressor (e.g., non-electrically powered compressor) is capable of providing, alone, to the engine at the current engine operating conditions (e.g., bypass valve around the turbine opened or closed).

If the conditions for using the electrically powered compressor are not met, the method advances to box 240 where the turbocharger is used to provide a supply of boosted air to the engine to meet a current demand from a driver of the vehicle. During most circumstances, this is the case as the turbocharger is sized to satisfy most of the needs of the engine with the exception of a very high torque demands at a high engine speeds. The method at 240 may further include not operating the electrically powered compressor and maintaining a shut-off valve downstream of the electrically powered compressor closed (so that no air flows from the electric compressor to the engine).

From box 240, the method advances to box 260 to check whether a Key-Off event has occurred and if it has advances to box 290 where it ends but otherwise returns to box 230 and will cycle through boxes 230, 240 and 260 until either the conditions for use of the electrically powered compressor are present or a Key-Off event has occurred.

Returning to box 230, if the conditions for use of the electrically powered compressor are present when checked in box 230, then the method advances from box 230 to box 250 where the electrically powered compressor is used to supply additional boosted air to the engine (e.g., in addition to the turbocharger compressor). The method at 250 is further expanded upon in FIG. 3B, as described below.

From box 250 the method advances to box 260 to check whether a Key-Off event has occurred and, if it has, advances to box 290 where it ends but otherwise returns to box 230 and will cycle through boxes 230, 250 and 260 until either the conditions for use of the electrically powered compressor are no longer present or a Key-Off event has occurred. One of the conditions that can be included in the check in box 230 is whether the electrically powered compressor is already operating and whether it has been operating for longer than a predefined period of time. If it has been operating for longer than a predefined period of time then this can be taken as an indication that the conditions for use of the electrically powered compressor are not met.

As shown in FIG. 3B, the box 250 includes in the case of this example a number of sub-steps indicated in box 252 as energizing or switching on of the electric motor used to drive the electrically powered compressor. In one example, the controller may send an electrical signal to actuate the electric motor of the electrically powered compressor in order to start operating the electrically powered compressor and generating boost pressure. Using the electrically powered compressor further includes, at box 254, building pressure in a recirculation circuit around the electrically powered compressor (e.g., recirculation circuit 102 shown in FIG. 1 or air recirculation circuit 19 shown in FIG. 2) to reduce interruptions in the supply of boosted air to the engine. For example, the method at 254 may include the controller closing (via an actuation signal) a shut off valve arranged downstream of an outlet of the electrically powered compressor (e.g., shut off valve 116 shown in FIG. 1 or shut off valve 16 shown in FIG. 2) and opening (via an actuation signal) a recirculation valve arranged in the recirculation circuit around the electrically powered compressor (e.g., recirculation valve 117 shown in FIG. 1 or recirculation valve 17 shown in FIG. 2). At 256, the method includes checking whether the pressure available from the electrically powered compressor (the pressure PRC in the recirculation circuit) is at least equal to the pressure (PTCO) existing in the air supply from the turbocharger to the engine. If the pressure PRC was found in box 256 to be at least equal to the pressure PTCO of the air supply from the turbocharger, the method proceeds to 258 to connect the electrically powered compressor to an inlet manifold of the engine. In one example, the method at 258 may include simultaneously closing the recirculation valve and opening the shut off valve. In this way, boosted air produced by the electrically powered compressor may flow from the outlet of the electrically powered compressor to the inlet (e.g., intake) manifold of the engine.

Therefore, in one embodiment, the method is operable to only use the electrically powered compressor to provide boost to the engine when predefined conditions are present and is arranged at all other times to use the turbocharger to provide boosted air to the engine.

The inventors have realized by careful analysis of real world running that the demands for power from an engine can be satisfied during most operating situations by using a conventional variable geometry turbocharger of a small size that is able to meet normal power demands but provides excellent low speed response to sudden torque demands.

For example, a medium hatchback vehicle will often require only 40 kW to operate at a constant speed of 100 kph but will be fitted with an engine rated at more than 80 kW.

Furthermore, during normal use many drivers' rarely use more that 50% of the available power and some rarely exceed 30% of the available power. It is only when high power is required to execute, for example, an overtaking maneuver that such a small turbocharger is unable to meet the demand.

Therefore, by using an electrically powered compressor to meet such high power transient demands while using the small turbocharger to meet all other demands, a more responsive and potentially more efficient boosted engine system is produced. The provision of a recirculation circuit for the electrically powered compressor may reduce air pressure fluctuations when energizing the electrically powered compressor to top up the boosted air supply from the turbocharger. As a result, pressure decreases at the intake manifold of the engine upon starting operating the electrically powered compressor may be reduced, thereby increasing an efficiency of the boosting system and reducing a likelihood of sudden decreases in torque output of the engine. By only using the electrically powered compressor when it is required to top up the supply of boosted air from the turbocharger and then only for short periods of high demand reduces the electrical drain on a battery of the motor vehicle to which the engine system is fitted thereby reducing the risk that the battery of the motor vehicle will become severely discharged and reducing the extra fuel subsequently required to recharge the battery. The technical effect of, responsive to a demanded torque being above a threshold while providing boosted air at a first pressure to an engine via a turbocharger compressor, operating an electric compressor arranged in parallel with the turbocharger compressor and fluidly disconnected from the engine to increase a second pressure in a recirculation circuit around the electric compressor; and responsive to the second pressure reaching the first pressure, fluidly connecting the electric compressor to the engine is preventing a sudden drop in boost pressure delivered to the engine upon operating the electric compressor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
responsive to a demanded torque being above a threshold while providing boosted air at a first pressure to an engine via a turbocharger compressor, operating an electric compressor via an electronic controller, wherein the electric compressor is arranged in parallel with the turbocharger compressor and wherein the electric compressor is fluidly disconnected from the engine, to increase a second pressure in a recirculation circuit around the electric compressor;
wherein the recirculation circuit comprises an electrically controlled first valve arranged to connect at a position between a shut-off valve and an outlet of the electric compressor; and
responsive to the second pressure reaching the first pressure, fluidly connecting the electric compressor to the engine.

2. The method of claim 1, wherein operating the electric compressor to increase the second pressure in the recirculation circuit includes operating an electric motor of the electric compressor while maintaining the first valve arranged in a path between the outlet of the electric compressor and an intake manifold of the engine closed and a second valve arranged in the recirculation circuit open.

3. The method of claim 2, wherein fluidly connecting the electric compressor to the engine includes simultaneously opening the first valve and closing the second valve to flow boosted air at the second pressure from the outlet of the electric compressor to the intake manifold of the engine.

4. The method of claim 1, wherein operating the electric compressor is further responsive to a bypass valve arranged in a bypass passage around a turbocharger turbine being open.

5. The method of claim 1, wherein the demanded torque is an operator demanded torque of the engine and wherein the threshold is a torque level corresponding to a maximum boost pressure that the turbocharger compressor is capable of providing to the engine at current operating conditions.

6. A boosted engine system for a motor vehicle, comprising:
an internal combustion engine;
a small capacity variable geometry turbocharger sized to meet demands for boosted air up to a predefined supply level; and
an electrically powered compressor operated by an electronic controller and arranged in parallel to the turbocharger, the engine being arranged to receive a primary supply of boosted air during normal engine running below the predefined supply level from the turbocharger and to receive a supplementary supply of boosted air from the electrically powered compressor when it is required to meet a temporary high demand for boosted air above the predefined supply level and a recirculation circuit to build up pressure when the electrically powered compressor is started before the electrically powered compressor is connected to the engine, the recirculation circuit comprising an electrically controlled recirculation valve to control flow of air through a conduit linking an outlet from the electrically powered compressor to an inlet to the electrically powered compressor, an electrically controlled shut-off valve located between the outlet from the electrically powered compressor and the engine to selectively isolate the outlet from the electrically powered compressor from the engine and a backflow control valve to prevent backflow of air from the inlet to the electrically powered compressor to atmosphere, wherein, upon starting of the electrically powered compressor the electrically controlled recirculation valve is kept open and the electrically controlled shut-off valve is kept closed until a pressure in the recirculation circuit has reached a predefined limit whereupon the electrically controlled shut-off valve is opened and the electrically controlled recirculation valve is closed.

7. The system as claimed in claim 6, wherein the backflow valve is a non-return valve arranged to prevent air from flowing from the inlet to the electrically powered compressor back to atmosphere.

8. The system as claimed in claim 6, wherein the backflow valve is an electrically controlled backflow valve arranged to automatically close if a pressure at the inlet to the electrically powered compressor is greater than atmospheric pressure so as to prevent air from flowing from the inlet to the electrically powered compressor back to atmosphere.

9. The system as claimed in claim 6, wherein there is a first flow path from atmosphere through the turbocharger to the engine and a second flow path from atmosphere through the electrically powered compressor arranged in parallel to the first flow path between a position upstream of the engine and a source of atmospheric air.

10. The system as claimed in claim 9, wherein the position upstream of the engine is an inlet to an intercooler having an outlet arranged to flow air to the engine, the system further comprising an air filter through which all air for the engine from the source of atmospheric air flows and the first and second air flow paths both have a respective low pressure end connected to an outlet from the air filter.

11. The system as claimed in claim 10, wherein the first flow path has a first portion connected at one end to the air filter and a second end connected to an inlet of a compressor of the turbocharger and a second portion connected at one end to an outlet of the compressor of the turbocharger and connected at a second end to the inlet of the intercooler and the second air flow path has a first portion including the backflow valve connected at one end to the air filter and a second end connected to the inlet to the electrically powered compressor and a second portion connected at one end to the outlet from the electrically powered compressor and connected at a second end to the inlet of the intercooler and the electrically controlled shut-off valve is arranged to control flow of boosted air through the second portion of the second flow path.

12. The system as claimed in claim 6, wherein the turbocharger has a turbine having an inlet arranged to receive a supply of exhaust gas from the engine, an outlet to flow exhaust gas to atmosphere, and a bypass passage having a bypass flow control valve that is connected between a position upstream from the inlet to the turbine and a position downstream from the outlet of the turbine, wherein the bypass flow control valve is an electrically controlled valve.

13. The system as claimed in claim 12, wherein opening and closing of the bypass flow control valve is controlled by the electronic controller of the system and the electronic controller is arranged to open the bypass flow control valve when a predefined exhaust gas pressure limit upstream from the turbine is reached.

14. The system as claimed in claim 12, wherein opening and closing of the bypass flow control valve is controlled by the electronic controller of the system and the electronic controller is arranged to open the bypass flow control valve when a predefined turbine rotational speed is reached.

15. The system as claimed in claim 6, wherein opening and closing of the electrically controlled shut-off valve and opening and closing of the electrically controlled recirculation valve are both controlled by the electronic controller.

16. The system as claimed in claim 15, wherein the electronic controller is arranged to stop use of the electrically powered compressor when a bypass flow control valve is in a closed state.

17. A method of controlling a boosted engine system of a motor vehicle, the system comprising an engine, a variable geometry turbocharger sized to meet demands for boosted air up to a predefined supply level, an electrically powered compressor controlled by an electric controller, the electrically powered compressor arranged in parallel to the turbocharger, the engine being arranged to receive a primary supply of boosted air during normal engine running below the predefined supply level from the turbocharger and to receive a supplementary supply of boosted air from the electrically powered compressor when it is required to meet a temporary high demand for boosted air above the predefined supply level, a recirculation circuit to build up pressure when the electrically powered compressor is started before the electrically powered compressor is connected to the engine, the boosted engine system further comprising a backflow valve to prevent backflow of air from an inlet to the electrically powered compressor, and an electrically controlled shut-off valve to selectively isolate an outlet of the electrically powered compressor from the engine, the recirculation circuit including an electrically controlled recirculation valve, wherein the method comprises:
  checking whether at least one condition for using the electrically powered compressor is present and, if the at least one condition is present, energizing the electrically powered compressor while the electrically controlled shut-off valve is kept closed and the electrically controlled recirculation valve is kept open to build up pressure in the recirculation circuit and, when the pressure in the recirculation circuit has reached a pressure at least equal to a pressure of the primary supply of boosted air, closing the electrically controlled recirculation valve and opening the electrically controlled shut-off valve to supply boosted air to the engine.

18. The method as claimed in claim 17, wherein one condition for using the electrically powered compressor is a demand for torque from a driver of the motor vehicle greater than a predefined limit.

19. The method as claimed in claim 17, wherein one condition for using the electrically powered compressor is a current requirement for boosted air that is above the predefined supply level and that cannot be met solely by use of the turbocharger.

20. The method as claimed in claim 17, wherein there are two conditions, both of which must be met for the electrically powered compressor to be energized, the first condition including a demand for torque from a driver of the motor vehicle greater than a predefined limit and the second condition including a current requirement for boosted air that is above the predefined supply level and that cannot be met solely by use of the turbocharger.

* * * * *